United States Patent [19]

Hsu

[11] Patent Number: 4,840,809

[45] Date of Patent: Jun. 20, 1989

[54] AGGLOMERATION PROCESS

[75] Inventor: Sheng H. Hsu, Marysville, Ohio

[73] Assignee: Nestec S.A., Vevey, Switzerland

[21] Appl. No.: 180,226

[22] Filed: Apr. 11, 1988

[51] Int. Cl.$^4$ ............................................. A23F 5/12
[52] U.S. Cl. ............................... 426/285; 23/313 R; 264/117; 426/453
[58] Field of Search ................ 426/285, 403; 264/117, 264/118; 23/313 R

[56]  References Cited

U.S. PATENT DOCUMENTS

| 2,400,292 | 12/1941 | Dalton . | |
|---|---|---|---|
| 3,615,670 | 3/1969 | Sienkiewicz et al. . | |
| 3,652,293 | 3/1969 | Lombana et al. . | |
| 3,830,943 | 8/1974 | Hix et al. | 426/453 |
| 4,308,288 | 3/1980 | Hara et al. . | |
| 4,640,839 | 6/1985 | Hsu . | |
| 4,777,056 | 10/1988 | Bahler et al. | 426/285 |

FOREIGN PATENT DOCUMENTS

| 0204256 | 12/1986 | European Pat. Off. . |
|---|---|---|
| 2402446 | 7/1975 | Fed. Rep. of Germany . |
| 742150 | 7/1952 | United Kingdom . |

OTHER PUBLICATIONS

Translation of German Patent Application 2402446, F. Strehle, 1974.

Primary Examiner—Peter Kratz
Attorney, Agent, or Firm—Vogt & O'Donnell

[57]  ABSTRACT

Agglomeration of particles of a pulverulent water-soluble material is achieved by conveying a layer of the material on a porous surface towards which a laminar flow of heated humid air is directed. A reduced pressure is applied from beneath the porous surface for drawing the heated humid air to contact the conveyed material for a time sufficient for fusing particles of the material at micropores formed at points of contact between the surfaces of the particles.

12 Claims, 3 Drawing Sheets

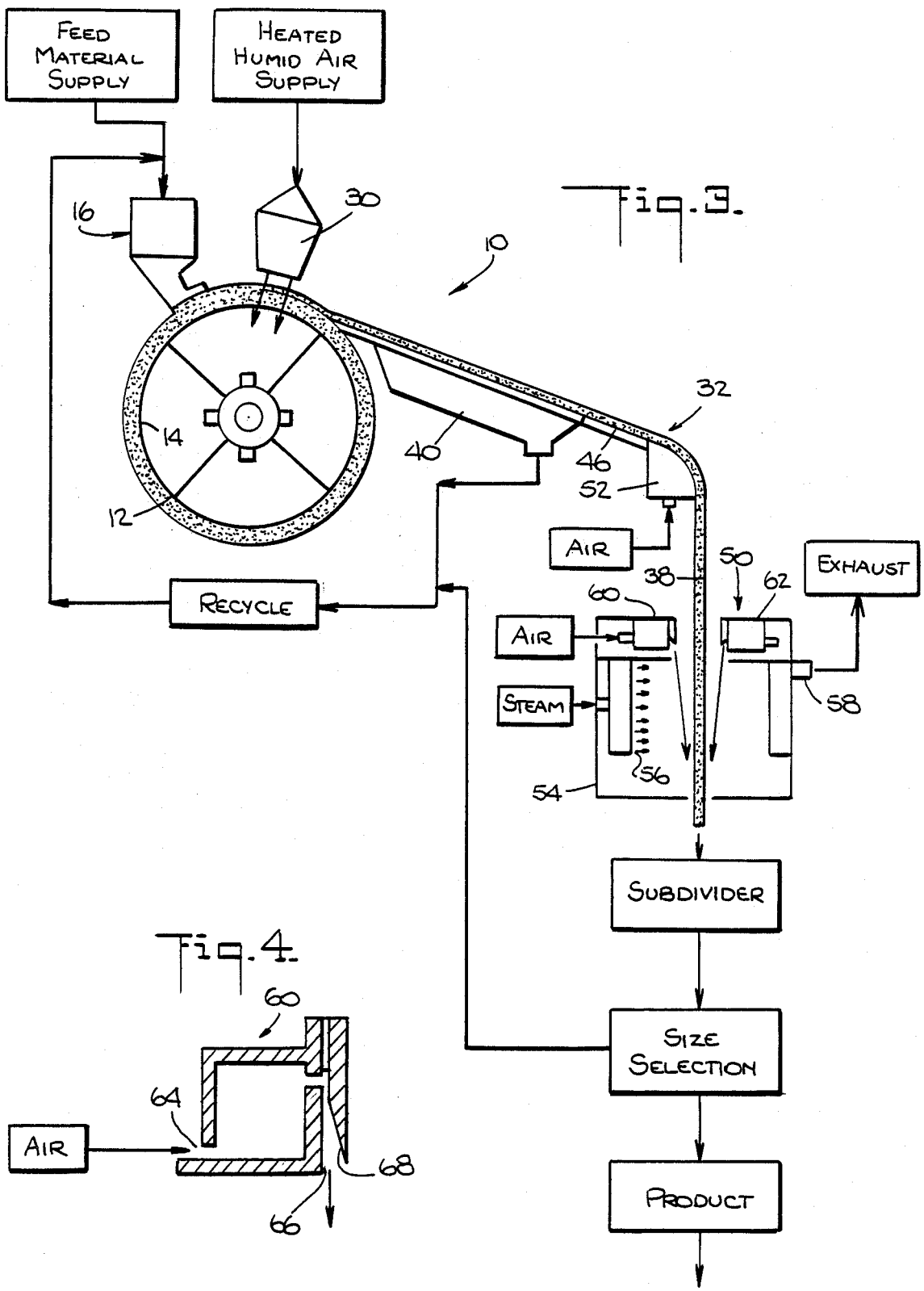

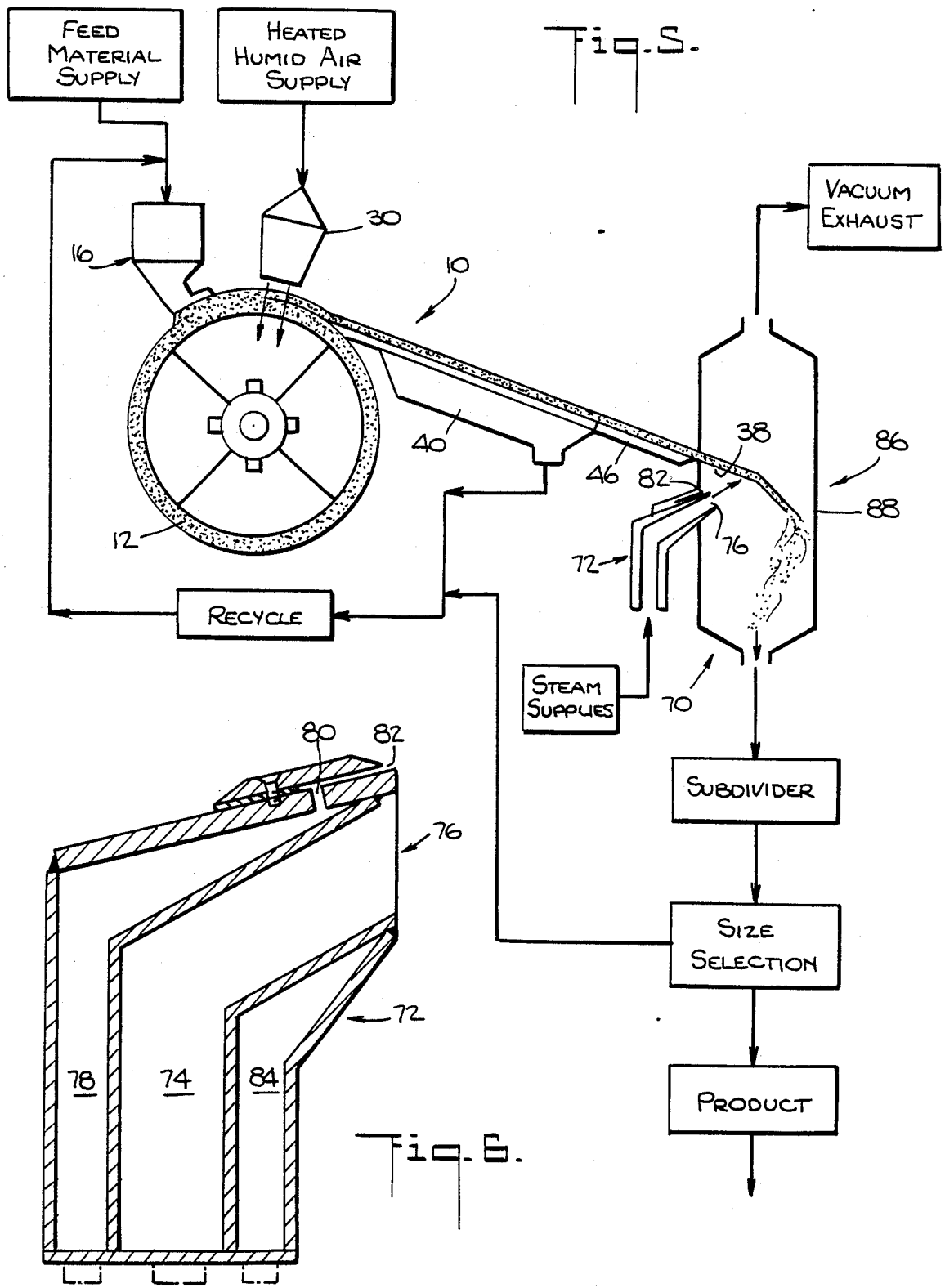

AGGLOMERATION PROCESS

BACKGROUND OF THE INVENTION

The present invention relates to agglomeration of pulverulent water-soluble particulate materials.

Many and various methods and apparati are utilized and have been proposed for agglomeration of water-soluble products, particularly comestibles including soluble coffee. For comestibles, agglomeration techniques seek to adjust particle size, bulk density and other product properties without being detrimental to flavor.

Many methods are known wherein agglomeration is achieved by compressive mechanical forces whereby the material to be agglomerated is formed into sheets, for example, and then the sheets are subdivided into agglomerates. Among these methods are procedures, such as disclosed in U.S. Pat. Nos. 2,400,292 and 4,308,288 and in British Patent Specification No. 742,150, for example. A variation of this theme may be found in German Published Application No. 24 02 446 which discloses moistening particulate material to be agglomerated and then applying heat and pressure to the moisturized material between two plates with the compressed material then being scraped off the lowermost plate and then subdivided for obtaining agglomerates.

U.S. Pat. No. 3,615,670 discloses a process and apparatus wherein particles to be agglomerated are wetted and spread onto a solid surface carrier which is passed over a heated zone to raise the temperature of the particles to their fusion point and dry the fused particles. The fused particles, which are in the form of a sheet, are then transferred to a second zone whereat they are rapidly cooled, and then the cooled sheet is subsequently subdivided for obtaining the agglomerates.

Agglomeration of water-soluble materials also long has been performed by methods and with apparati well-known to the artisan which utilize a tower and associated apparati for contacting airborne particles of a particulate material with steam in a turbulent environment which enforces contact between wetted particles to accomplish the agglomeration. In such processes, substantial amounts of energy and moisture in the form of steam are required, and typically, only one type of product can be obtained which is characterized by agglomerates having a smooth, rounded form. Also, because of the amount of moisture and heat utilized, generally, flavor is somewhat adversely affected.

Additionally, conventional airborne turbulent steam tower agglomeration processes typically require that the particles to be agglomerated have an average particle size in the range of from about 20$\mu$ to about 50$\mu$. Thus, when that process of agglomeration is practiced with materials which have been produced by spray-drying, as is common in the art, generally, a first step of reducing the size of the spray-dried particles is required prior to the agglomeration process because conventional spray drying processes typically produce particles having average particle sizes which range from about 75$\mu$ to about 100$\mu$.

Another method which utilizes a jet of steam for agglomerating a small airborne stream of coffee particles which are in the form of flakes is disclosed in U.S. Pat. No. 3,652,293. As taught by this patent, before agglomeration, the flakes are obtained by mechanical compression of coffee particles. It is disclosed that an agglomerted product having a glistening surface and unique appearance results from the agglomeration step. A further airborne agglomerating process and apparatus is disclosed in U.S. Pat. No. 4,640,839 for reducing energy and equipment costs and for obtaining a variety of densities, and particle shapes and appearances, including a roast and ground appearance when agglomerating soluble coffee, while minimizing flavor degradation. This process involves passing a stream of particulate material to be agglomerated through an apparatus having means for diffusing an aqueous gas in a non-turbulent flow inwardly to and about the stream of material for achieving agglomeration.

Lastly, European Published Application No. 0204256 discloses agglomerating water-soluble materials to obtain a variety of appearances, which include, particularly in the case of soluble coffee, an appearance of roast and ground coffee and freeze-dried coffee, while utilizing a minimal amount of moisture and energy and thus minimizing flavor degradation. In this process and by means of the apparatus, the surfaces of particles of a stream of water-soluble particulate material are heated and moistened for forming a flowable sticky coating on the particles to be agglomerated. The heated and moistened particles then are passed through a nip between two endless surfaces without applying substantial pressure from the endless surfaces to the particles for converging, merging and consolidating the particles for bonding the particles with one another without substantially affecting the shape and form of the particles.

SUMMARY OF THE INVENTION

In accordance with the present invention, agglomerates are formed from water-soluble particulate material by fusing particles of the material without the utilization of mechanical compressive forces while utilizing a minimum amount of moisture and energy. Essentially any water-soluble particulate material which is desired to be agglomerated can be treated by the present invention as long as the material is of a class which has characteristics of becoming at least somewhat flowable and of becoming sticky, tacky, or plastic at least on its surface when moistened and/or heated.

The process and the apparatus of the present invention provide for the formation of agglomerates having shapes varying from flakes to sharp-edged granules to sponge-like particles. Particularly in the case of processing spray-dried soluble coffee in accordance with the present invention, agglomerates may be formed readily which have a freeze-dried look-alike appearance and texture. It is also of note that practice of the present invention, in many instances, does not necessarily require a step of size reduction of materials which were processed first by conventional spray-drying processes.

The process of the present invention is characterized by conveying a layer of particles of a water-soluble particulate material on a porous surface, directing a laminar flow of heated humid air towards the layer of particles being conveyed and applying a reduced pressure, that is, a pressure less than atmospheric pressure, from beneath the porous surface for drawing the heated humid air to the layer of material for contacting the heated humid air with particles of the conveyed particulate material layer for a time sufficient for fusing particles of the layer at points of contact between the surfaces of the particles while substantially avoiding condensation of moisture in voids between the surfaces of the particles. Agglomertes are obtained by subdividing the fused material, and the agglomerates may be size-selected by screening, for example. Additionally, after the fused material is removed from the porous surface, the process may include reinforcing the fused material, which is generally in the form of a sheet, by directing heated humid air for contacting it, particularly the surface side of the material which was closest to the porous surface, with the heated humid air for fusing particles of the fused material at points of contact between the surfaces of the particles while substantially avoiding condensation of moisture in voids between the surfaces of the particles.

Thus, when operating in accordance with the process of the present invention, capillary condensation of moisture results at points of contact between the surfaces of the particles whereat micropores, which approach a size from the micron to the submicron range, are formed. Condensation of moisture on the surfaces of the particles away from the micropores, that is, the surfaces of the particles in voids between the particles, substantially is avoided.

For purposes of this disclosure and claims, the term "voids between the particles" is intended to mean the places where the surfaces of neighboring particles are not in contact, that is, the void spaces between the points of contact of neighboring particles. In accordance with the present invention, the atmosphere around the particles is not saturated with moisture, and fusion of the particles, i.e., aggolmeration, occurs by reason of capillary condensation in the micropores at points of contact between the surfaces of the particles. Thus, this is quite in contrast to various prior art methods which result in moisture condensing and collecting primarily on the surfaces of the particles and/or at voids between the particles of the particulate material.

A preferred embodiment of the process of the present invention is characterized in that the porous conveyor surface forms the surface of a rotary drum and in that the reduced pressure is applied from within the drum in an amount which is at least sufficient for maintaining the layer of the material on the porous surface of the drum throughout the complete rotation of the drum. In this embodiment, it has been found that a reduced pressure sufficient for maintaining the layer of particulate material on the surface of the drum throughout its rotation is sufficient for drawing the heated humid air to the bed layer of material for fusing the particles of the layer at points of contact between the surfaces of the particles.

The present invention also provides apparatus for carrying out the disclosed process and is characterized in that the apparatus includes means having a porous surface for conveying a layer of particulate material, means for directing a laminar flow of heated humid air towards the layer of material on the conveying means and means for applying a reduced pressure, that is, a pressure less than atmospheric pressure, from beneath the porous surface for drawing the heated humid air to the conveyed layer of material for contacting the heated humid air with the particulate material of the layer for a time sufficient for fusing particles of the material at points of contact between the surfaces of the particles while substantially avoiding condensation of moisture in voids between the surfaces of the particles. Means are included for subdividing the fused material, and means are provided for size-selecting the subdivided agglomerates, if desired. Additionally, means may be provided for reinforcing the fused material, which is generally in the form of a sheet, by contacting it, particularly the surface side of the fused material which was closest to the porous surface, with heated humid air. Thus, this embodiment includes means for directing heated humid air at the fused material for fusing particles of the fused material at points of contact between the surfaces of the particles while substantially avoiding condensation of moisture in voids between the surfaces of the particles.

The preferred apparatus of the present invention is characterized in that the means for conveying the layer of particulate material is a rotary drum having a porous surface and in that means are associated with the drum for reducing the pressure within the drum. The reduced pressure applied within the drum is that which is sufficient for maintaining the layer of the particulate material on the surface of the drum throughout the rotation of the drum.

Further, in the process of the present invention, the layer of particulate material is formed on the porous surface by depositing the material to be agglomerated on the conveying surface and then shaping the deposited material for forming a smooth upper surface for the material layer. Thus, the present invention includes further apparatus which, in combination with that disclosed above, includes means for depositing the material on the porous surface of the conveying means and means for shaping the deposited material for forming a smooth upper surface for the material layer. The upper surface may be shaped to be flat or shaped to have various surface configurations. Preferably, the surface has a smoothed corrugated form.

What is important with regard to practice of the present invention is that condensation of moisture occurs only at the micropores formed at points of contact between the particles by reason of capillary action for fusing the particles. To achieve this goal, therefore, the temperature and humidity of the laminar flow of heated humid air, with respect to the temperature of the particles and the time of contact of the heated humid air with the particles, is controlled for obtaining only the desired capillary condensation. The temperature and humidity of the air with respect to the temperature of the particles may be brought almost to the point of deliquescence, but deliquescence, that is, nucleation of water molecules by reason of supersaturation and condensation, in the voids between surfaces of the particles is substantially to be avoided, as such will result in over-agglomeration and, generally, undesired densities.

As will be appreciated by the artisan, the residence time of the layer of particles in contact with the heated humid air will be affected by the physical dimensions of the means for directing the laminar heated humid air and the rate of travel of the conveyed particulate material. As the artisan also will appreciate, bed packing, i.e., the density of the particles of the bed, is primarily related not only to the amount of reduced pressure applied and maintained beneath the porous surface but also to average particle size and the roughness of the surfaces of the particles. Although the effect of the capillary condensation becomes enhanced as the size of the micropores between the particles approaches the submicron range, as the artisan further will appreciate, the smaller the particle size and/or the more the pressure is reduced, which will result in more points of contact, generally, the particulate material bed will be more compressed and dense and thus, the density of the agglomerates generally will be greater. With the teachings of this disclosure in-hand, however, the artisan will be able readily to coordinate such variables to obtain desired and optimal products.

These and other features and advantages will become apparent further in connection with the description of the drawings and description of preferred embodiments.

BRIEF DESCRIPTION OF DRAWINGS

FIG. 3 is a side elevation view of a further embodiment of FIG. 1 wherein the side of the fused material which was closest to the porous surface is reinforced.

FIG. 4 is a side elevation view of a means for supplying an air curtain for containing heated humid air in the reinforcing embodiment of FIG. 3.

FIG. 5 is side elevation view of a further embodiment of FIG. 1 illustrating an alternative for reinforcing the fused material.

FIG. 6 is a side elevation view of a means for supplying reinforcing heated humid air for the embodiment of FIG. 5.

DESCRIPTION OF PREFERRED EMBODIMENTS

In practice of the present invention, the sizes of the particles of the particulate material to be agglomerated advantageously may span a broad range of sizes including average particle sizes ranging from about $40\mu$ to about $150\mu$. An average particle size may be determined by various methods well-known to the artisan. For all measurements herein, the average particle sizes are determined by utilizing a MICROTRAC particle size analyzer such as can be obtained from Leeds & Northrup Instrument Co.

When operating in accordance with the present invention it has been found that differing sizes of particulate material will result in agglomertes which generally will have differing textures, appearances, forms and physical properties. For example, it has been found that spray-dried soluble coffee having average particle sizes on the order of from about $40\mu$ to about $50\mu$ will provide agglomerated particles which tend to have an appearance of thin flakes. For particle sizes of spray-dried soluble coffee on the order of from about $50\mu$ up to about $80\mu$, agglomerates result which have a smooth surface and a texture very similar to freeze-dried soluble coffee. With average particle sizes in excess of $80\mu$, a freeze-dried texture and appearance still may be obtained, but as the size of a spray-dried soluble coffee approaches and exceeds an average particle size of about $100\mu$, a rougher surface appearance tends to result, and the agglomerated particles tend to have an appearance and texture somewhat similar to that obtained with airborne, turbulent steam type agglomeration processes and apparati, noted above.

Figure 1:
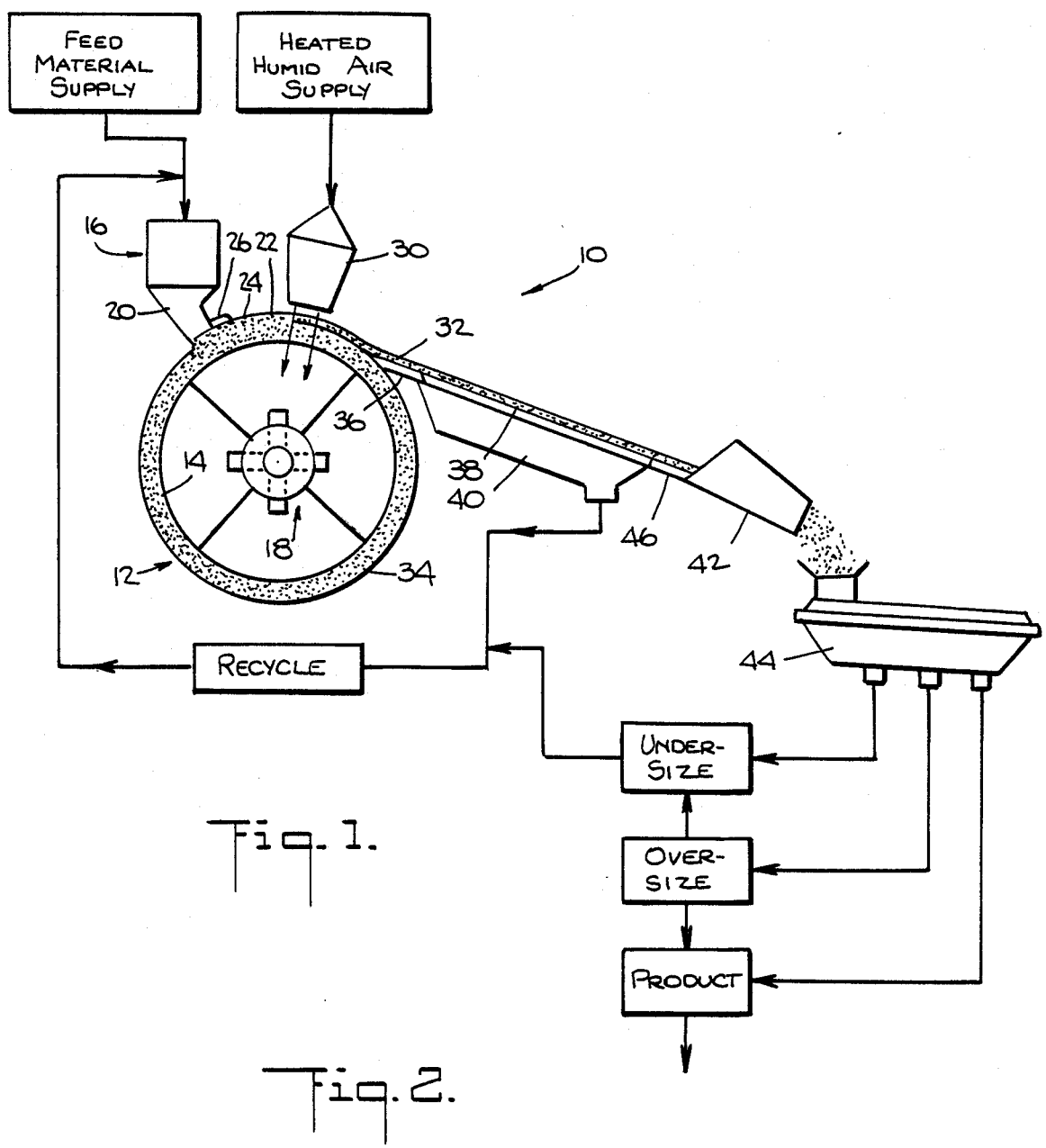
FIG. 1 is a side elevation view of a preferred embodiment of the present invention.

Although the conveying means of the present invention may be a linear surface, the preferred embodiment of the combination of apparatus of the present invention, designated generally in FIG. 1 by reference numeral 10, includes a rotary drum, designated generally as drum 12. Rotary drum 12 is provided with a porous surface 14 and receives water-soluble particulate material from feed material supply means 16. Means for supporting drum surface 14 and for applying a reduced pressure within the drum, that is, a pressure less than atmospheric pressure, are designated generally by reference numeral 18.

Rotary drums which have porous surfaces and operate with reduced pressures have been known since about the 1870's for filtering slurries, wherein the drums are rotated partially submerged in a slurry filled vat to pick up a slurry material on the porous surface by reason of reduced pressure applied to the porous surface from within the drum. After picking up the slurry from the vat, filtering is accomplished via the porous surface by reason of the reduced pressure within the drum, the filtrate is collected and drained from within the drum, and a scraper removes the filtered material collected on the drum surface. Drums known in the art, such as are available from, for example, the Komline-Sanderson Company, may be utilized in the present invention. The drum features of importance to the present invention are the material composition of the porous surface, pore size and porosity.

Porous drum surface 14 should be made of materials which are non-reactive with the material to be agglomerated, with polymeric materials such as polyethylene or polypropylene and like materials being preferred. The pore sizes of the drum surface are selected to be of a size substantially less than the size of the particulate material to be agglomerated. The pore sizes need not be uniform, but the smaller the particle size of the material to be treated, the smaller the pore sizes of the porous surface should be for avoiding entraining particulate material into the interior of the drum and into the system which produces and applies the reduced pressure. Generally, the pore sizes should be on the order of no more than about one-tenth the average particle size of the particulate material to be agglomerated, and preferably, the pore sizes should be on the order of about one-tenth to one-fortieth the average particle size of the material to be agglomerated. In practice of the invention, with material to be agglomerated having average particle sizes noted above, pore sizes ranging from about $2\mu$ to about $5\mu$ have been found quite satisfactory.

As for porosity, such is dependent upon pore size and upon the the distribution of the pores. The pores should be distributed throughout the conveying surface. Porosity can be determined by passing air at a pressure of about 3.5 kPa through a 2.5 cm square portion of a sample of the porous surface material for determining air flow, as is known in the art of rotary vacuum drums. Porosities on the order of about $0.4 \times 10^{-3}$ m$^3$/sec to about $0.5 \times 10^{-3}$ m$^3$/sec are satisfactory.

Material feed depositing means 20 of feed material supply means 16 is constructed to have dimensions compatible with and for the most efficient feeding and utilization of porous surface 14 of drum 12. Thus, preferably, feed depositing means 20 may be provided as an elongated feed hopper for feeding material substantially over the width of porous surface 14 of drum 12. Appropriate flow controls, as are well-known to those skilled in the art, are provided for controlling the amount of material fed to the drum surface.

Figure 2:
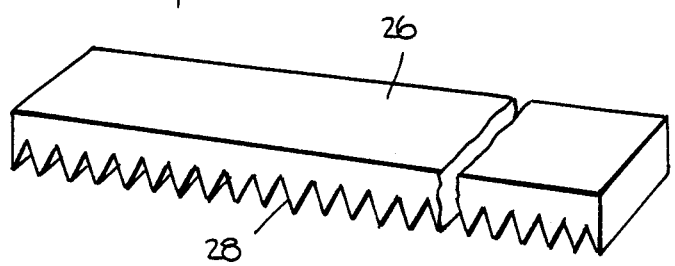
FIG. 2 is a perspective view of a shaper preferred for smoothing a layer of material on the porous conveying surface.

Upon deposit of the particulate material to be agglomerated upon porous surface 14, material layer 22 is smoothed and shaped by shaper 26 to have upper surface 24. Preferred means for shaping are provided as illustrated in FIG. 2, wherein shaper 26 is depicted as having a corrugated shape by reason of serrated-type edges which are designated, generally and collectively, by reference numeral 28. Although straight edge shapers, which merely smooth and even the material, are found to be quite satisfactory, a shaper of a corrugated or serrated configuration provides a layer of particulate material which has a larger surface area, because of the formation of ridges and valleys, than does a layer having a flat even surface.

Upon start-up, porous drum surface 14 has no material on it. Material is fed via feed material supply means 16 and depositing means 20 for deposit on porous surface 14. Shaper 26 forms upper surface 24 of layer 22 after deposit of material on drum 12. The pressure within drum 12 is reduced to an extent so that the shaped, deposited particulate material is caused to adhere to porous surface 14 throughout the entire rotation of drum 12. As will be appreciated readily by one of ordinary skill, the material adheres primarily by reason of the force of air drawn through the bed of particulate material into the interior of drum 12 which creates a drag force relative to the particulate material which enables the particulate material to adhere to the surface of the drum throughout the rotation of the drum.

As the material is conveyed on the conveying means, that is, rotary drum 12, as here depicted, contact is made between the particulate material and a laminar flow of heated humid air from directing means 30 which directs the flow of the heated humid air towards layer 22. By reason of the laminar flow of heated humid air and the reduced pressure within the drum surface, the directed heated humid air penetrates surface 24 of layer 22 but does not disturb the surface to any appreciable extent, and the shape of the layer, even if corrugated, is maintained readily.

The laminar flow of heated humid air is directed by means 30 to material layer 22 at a superficial velocity of below about $340 \times 10^{-3}$ m/sec, and preferably at a superficial velocity of from about $22 \times 10^{-3}$ m/sec to $200 \times 10^{-3}$ m/sec and most preferably from about $45 \times 10^{-3}$ m/sec to about $130 \times 10^{-3}$ m/sec. As is well known, a superficial velocity of a gas is a value which is calculated and based upon an empty pipe flow velocity, and whether a flow is laminar or turbulent may be related to a Reynolds number which is calculated by means of the formula:

$$R_E = d\rho u/\mu$$

wherein d is the hydraulic diameter, $\rho$ is the density of the fluid, u is the velocity of the fluid, and $\mu$ is the viscosity of the fluid. In this case the fluid is air, and it is accepted generally that at Reynolds numbers below 2,100, the flow of air is laminar, that above 2,100 to about 4,000, the flow is in a transition zone, and that as the Reynolds numbers closely approach and exceed 4,000, the flow is turbulent.

The above-indicated laminar heated humid air flow superficial velocities correspond with Reynolds numbers of below about 2,100, from about 150 to about 1,400 and from about 310 to about 900, respectively.

The reduced pressures applied and maintained within the drum are on the order of from about 0.829 atm to about 0.996 atm, preferably about 0.934 atm to about 0.993 atm and most preferably from about 0.947 atm to about 0.984 atm. As the artisan will appreciate, the porosity of the surface, the particle size, the physical shape of the particles, and the thickness of the bed will affect the bed packing density of the material for any particular reduced pressure applied and maintained within the drum. In general, however, for surface porosities on the order of 0.4 to $0.5 \times 10^{-3}$ m$^3$/sec these reduced pressures are quite satisfactory for maintaining layers of the material having particle sizes ranging from $40\mu$ to $150\mu$ having bed depths up to and somewhat in excess of 30 mm on a drum.

As a result of the reduced pressure within the drum, the flow of the directed laminar heated humid air is drawn towards the layer of particulate material. Thus, the length and width of laminar heated humid air flow directing means 30 should be sized and configured for effecting contact in combination with the draw of the reduced pressue from within the drum, over the width of the layer on porous surface 14. Because of the draw of the reduced pressure, the length of the directing means need not necessarily encompass the entire width of the conveying means, and the length and width of the directing means may be in a ratio of from 1:4 to 1:2, for example. The width of directing means will impact upon residence time and may be varied to alter residence time, and thus, the width of the heated humid air directing means is a variable to be considered in the context of the rate of travel of the conveyed material and the amount of residence time the material is in contact with the heated humid air.

In the present invention, the particulate material to be agglomerated may be conveniently at ambient temperature when treated, but such is not required. When the particulate material is at about ambient temperature, the heated humid air should have a temperature of from about 40° C. to about 100° C., preferably of from about 60° C. to about 90° C. The heated humid air should have a humidity range, expressed in an absolute basis, of from about 0.1 kg water/kg air to about 0.8 kg water/kg air and preferably from about 0.3 kg water/kg air to 0.4 kg water/kg air.

To achieve the desired results of the present invention, the rate the material is conveyed is such that the material is maintained within an area of contact with the heated humid air for a period of time sufficient for fusing particles at micropores formed at the points of contact between the surfaces of the particles while substantially avoiding condensation in voids between the surfaces of the particles. As the artisan will appreciate, if the particulate material is not at ambient temperature, adjustments of the temperature and humidity of the laminar flow of heated humid air, or of the time of contact, should be made for achieving condensation in the micropores formed at the points of contact between the surfaces of the particles while avoiding condensation in the voids between the surfaces of the particles.

In accordance with the conditions set forth above, residence times in the area of contact between the heated humid air and conveyed particulate material of from about 1 sec, for relatively high humidity heated humid air approaching 0.8 kg water/kg air, to about 6 sec, for relatively low humidity heated humid air approaching 0.1 kg water/kg air, are utilized. The residence times for the preferred conditions of the heated humid air, noted above, range from about 2 sec to about 3 sec. Thus, such residence times are achieved with respect to the configurations and dimensions of heated humid air directing means 30 and the peripheral or linear speed of the material conveyed.

Generally, when operating with a rotary vacuum drum, as illustrated, it is preferred that layer 22 be of a thickness such that only an upper layer portion 32 of layer 22 becomes fused. In practice, for soluble coffee, for an initial layer having a bed depth thickness of from about 15 mm to about 30 mm, for example, the thickness of the bed depth which is fused is, generally, when operating in accordance with the foregoing conditions, from about 3 mm to about 6 mm thick. Upon removal of fused material layer 32 from unfused layer 34 and as the drum continues to rotate with unfused layer 34 adhering to surface 14 by reason of the reduced pressure, fresh material is deposited onto layer 34 by feed material supply means 20 for forming continuously what will become fused layer 32.

Even though it has been found that fused layer 32 tends to peel off readily as a sheet from unfused material, preferably, the fused layer is removed conveniently from the drum with the assistance of means such as a discharge knife 36, i.e., a doctor blade, for example. the discharge knife is positioned to remove substantially only the layer of fused material from lower unfused layer portion 34 which remains on the rotating drum throughout the rotation of the drum by reason of the reduced pressure within the drum. Unfused layer 34 may be discharged from the rotating drum readily simply by eliminating the reduced pressure within the drum.

Alternatively, the process may be run batchwise wherein deposit of fresh material on the rotary drum is made intermittently. Thus, because of fused material being removed from the drum, the thickness of the unfused layer becomes progressively less. Thus, particularly for this batchwise embodiment, for assuring uniformity of the fused product particularly with regard to its density, it is advisable to adjust the amount of reduced pressure applied and maintained within the drum as the thickness of the layer is reduced for avoiding unwanted density increases due to more dense bed packing of the unfused material of thee remaining bed layer.

It should be noted also that when operating with a linear endless conveying means, unless reduced pressure is maintained for the entire length of the conveyor and its return path for retaining material on the surface of the conveyor through its endless course, the bed depth selected most advantageously will be that by which essentially the entire bed depth is fused. Of course, the bed depth utilized with a rotary drum also may be a depth at which essentially the entire bed depth will be fused.

After removal from the drum or conveyor, the fused material then may be subdivided into agglomerates, and if the agglomerates are then selected according to size, the undersized particles may be incorporated into the material fed into feed material supply means 16, and oversized particles may be broken further.

Additionally, upon removal of the fused material from the drum, usually some unfused particles will adhere to bottom surface 38 of fused material layer 32. To separate any adhering unfused particulate material clinging to the bottom surface 38 of the fused material, such may be passed over a screening means 40. The unfused particles which are recovered are recycled back to the feeding device as illustrated by the block diagram poriton of FIG. 1. Thus, as illustrated in FIG. 1, a subdividing means 42 follows screening means 40, and the subdividing means is followed by size-selection means 44. Solid slide 46 may be utilized to interconnect screening means 40 and subdividing means 42 for reducing stress on the sheet and avoiding cracking or breaking of the sheet prior to delivery to the subdividing means. Preferably, the screen and slide, and hence the path of travel of the fused material, are inclined downwards in the direction of travel of the fused material. As further indicated by the block diagram portion of FIG. 1, undersized particles are recycled back to feed material supply means 20 and oversized particles may be further subdivided to obtain more product, which will result also in formation of further undersized particles.

It should be noted also that when utilizing a corrugated surface layer shaper as illustrated in FIG. 2, since the heated humid air tends to moisturize to a uniform bed depth, some material in the valleys may be fused while some material in the ridges at the same distance from the porous surface may not be fused. Thus, when removing the ridge and valley fused material with a discharge knife, unfused material under the ridges also will be removed. Hence, the screening described above becomes particularly useful.

Preferably, screening means 40 is a vibrating screen as is well-known to those skilled in the art, such as a LINK-BELT screen sold by FMC Corporation. The degree of separation is dependent upon the degree of vibration, mesh size and length of travel over the screen, and as the artisan will appreciate, the screen should not be vibrated to an extent that the fused material is unduly stressed and broken.

As the artisan additionally will appreciate, the temperature and moisture content of the material will increase during the agglomeration process. When operating within the foregoing conditions for agglomerating soluble coffee initially at ambient temperature and having a moisture content of about 3% when treated, it has been found that, generally, the fused particulate material will have a temperature ranging from above ambient temperature to about 35° C. and a moisture content on the order of from about 4.5% to about 6 % when fused. Thus, generally, the artisan will desire utilizing a drying step preferably after breaking the agglomerates but most preferably after size-selection of the agglomerates. For example, in the case of soluble coffee, the drying will provide a product having a moisture content on the order of about 3% to about 4% by weight, based upon the weight of the product.

Optionally, whether screening is performed or not for removing unfused material from the underside 38 of the fused material which was closest to the porous surface, underside 38 may be reinforced for increasing the strength of the sheet of material such as by contacting the sheet with heated humid air. Particular embodiments for accomplishing this are illustrated in FIGS. 3 and 5. Again, when reinforcing the sheet with the heated humid air, condensation of moisture and fusing in the voids between the particle surfaces should be substantially avoided.

As depicted in FIG. 3, one technique which may be utilized for reinforcing and increasing the strength of the sheet involves contacting underside 38 of fused material sheet 32, while it is still ina plastic state, with heated humid air. As illustrated, the reinforcement means is designated generally by reference numeral 50. After departing vibrating screen 40 and slide 46, sheet 32 is bent into a vertical orientation over curved porous slide 52 through which air, which may be at ambient conditions, is provided under a pressure sufficient for providing an air cushion for minimizing friction over the curved slide thus minimizing stress on the sheet. Pore sizes of about 10$\mu$ and air pressures on the order of about 2 kPa are sufficient. After being bent into a vertical orientation, the sheet is then subjected to heated humid air supplied in the form of diffusive steam with contact between the heated humid air and the sheet being enhanced by confining it with air curtains.

The main criterion sought for reinforcing the sheet in this reinforcing embodiment is to provide heated humid air having an average humidity of from about 0.05 kg water/kg air to about 0.2 kg water/kg air and preferably about 0.1 kg water/kg air for contacting the sheet. This may be accomplished readily by supplying steam at a temperature of about 100° C. under a low pressure of from about 1 kPa to about 5 kPa to an enclosure, designated generally by reference numeral 54, having a porous wall or plate 56 parallel with the underside of the sheet for diffusing the steam supplied to the sheet. Pore sizes in porous plate 56 on the order of from about $2\mu$ to about $20\mu$, preferably about $10\mu$, are sufficient to diffuse the steam supplied at the aforesaid pressures to obtain the desired humidity.

Excess steam may be evacuated from around the edges of sheet 32 by exhaust means 58. For confining the heated humid air and preventing if from rising up the sheet towards the air film slide and for enhancing results, at least one air curtain ejector preferably is utilized. Two ejectors, as illustrated, designated 60 and 62, are preferred. The ejectors confine the heated humid air particularly in relation to underside 38 and urge it downwards along the path of travel of sheet 32. An illustration of an ejector for confining the heated humid air is provided in FIG. 4, wherein ejector 60 has an air inlet 64 and outlet 66, the outlet having side 68 tapered angularly for assisting in directing air downwardly towards the side of the sheet.

The air utilized is preferably at elevated temperature and assists in substantially avoiding condensation of moisture in voids between the surfaces of the particles. Air temperatures in the range of from about 38° C. to about 94° C. are satisfactory. The velocity of the air curtain urged by the ejectors may range from about 8 m/sec to about 10 m/sec, for example. Thus, in accordance with the above disclosed conditions, the time of contact of the heated humid air with the sheet generally is for about 1 sec to about 5 sec and preferably about 3 sec. The reinforced sheet then may be passed to a subdivider for obtaining individual agglomerates which then may be sized-selectd, if desired, as disclosed in the block diagram portion of FIG. 3 and as disclosed above in connection with FIG. 1.

It has been found that, in practice of this reinforcement technique for agglomerating soluble coffee, the particle size of the original unagglomerated material plays a role. Generally, when particle sizes of the soluble coffee to be agglomerated are above about $80\mu$, the resultant fused sheet is not plastic enough to bend over curved air slide 52 to achieve the desired vertical orientation. Particle sizes between about $50\mu$ to about $80\mu$ have been found to perform satisfactorily, but particle sizes from about $40\mu$ to about $50\mu$ provide the best results because the strength of the plastic fused sheet is sufficient to bend readily over the air slide and achieve the desired vertical orientation.

As illustrated in FIG. 5, a further means, designated generally by reference numeral 70, for reinforcing the sheet employs the use of a "guided crocodile" nozzle, designated generally as nozzle 72, and also being further illustrated in FIG. 6. A "crocodile" nozzle is known in the art as comprising essentially a pipe having a rectangular opening. The "guided crocodile" nozzle, as herein utilized, has crocodile nozzle portion 74 having opening 76 and additional nozzle portions 78 and 80 having opening 82 built on top of crocodile nozzle portion 74. The ratio of the area of opening 76 to the area of opening 82 may range from 10:1 to about 200:1 and preferably is about 50:1. Steam jacket 84 may surround the nozzle for assuring greater control of temperature.

Whether or not vibrating screen 40 and slide 46 are utilized, fused sheet 32, while in a plastic state, is moved, again preferably in a downwardly inclined path of travel, past guided crocodile nozzle 72 for contacting underside surface 38 of the fused material sheet with the heated humid air, in that, low velocity steam is supplied via nozzle portion 74 to opening 76, and high velocity steam is supplied via nozzle portions 78 and 80 to opening 82 for providing heated humid air to underside 38 of sheet 32, the steam being at about 100° C. The low velocity steam is directed at from about 0.5 m/sec to about 2 m/sec and preferably from about 0.75 m/sec to about 1.25 m/sec, and the high velocity steam is directed at a velocity of from about 40 m/sec to about 80 m/sec and preferably from about 55 m/sec to about 65 m/sec. By reason of the combination of low and high velocity streams of steam, the high velocity steam guides the low velocity steam towards the sheet and prevents steam from rising upwards along the sheet towards screen 40, for example.

As the object is to contact the sheet for a short period of time with heated humid air for capillary fusion of the particles, the main criterion, as in the prior alternative reinforcing embodiment, is to obtain a particular absolute humidity of the air by reason of the guided crocodile steam, and in this case, such is from about 0.5 kg water/kg air to about 1.5 kg water/kg air, preferably about 1.1 kg water/kg air. The difference of humidity between this reinforcing embodiment and the prior embodiment being that in this embodiment the contact time of the heated humid air with the sheet is substantially shorter.

Preferably and advantageously, enclosure 86, surrounds and encompasses nozzle 72 and outer periphery of the fused sheet for facilitating contacting underside surface 38 with the heated humid air. Although the heatd humid air could be evacuated by exhausts only, preferably, enclosure 86 is maintained at a slightly reduced preessure of from about 0.9992 atm to about 0.9995 atm for accommodating escape of humid air from the enclosure.

In practicing this embodiment, wall 88 of enclosure 86 in the downstream direction of travel of the reinforced sheet is utilized conveniently for initially subdividing the sheet. The bottom portion of the enclosure therefore advantageously is designed to be in the shape of a hopper, for example, for feeding the subdivided material to a further subdividing means after which the product may be size-selected, if desired.

Treating the fused material of the present invention with these reinforcing techniques generally will result in a product having a moisture content of from about 5% to about 8%, and after treatment, the material should be dried to moisture content of from about 3% to 4%.

Subdividing of the fused material may be achieved with various devices. It will be noted, however, that because the fused material is in the form of a sheet, or sheet-like pieces, with certain conventional subdividing devices such as a ROTEX apparatus made by Rotex, Inc., particularly when the sheet is reinforced as described above, the sheet tends to slide upon a screen surface making devices such as a ROTEX apparatus not as useful as they are with agglomertes formed in conventional airborne turbulent agglomertion processes which produce coarse agglomertes, for example. Thus, because of the nature and form of the material to be subdivided, a device having means to at least rub and rupture the fused material is most advantageous.

Best results have been obtained by subdividing by hand wherein a bundle of sharp needles are utilized to impact and break the sheet through a screen. Mechanized means are adapted to perform these functions. For example, a modified jaw crusher may be utilized wherein the sheet or pieces of the sheet are passed through two jaws, a bottom jaw being a screen and the top jaw being modified to have needles protruding for breaking the pieces on the screen. Also found acceptable is a subdividing device having a perforated basket having an internal rotating anchor such as a QUADRO COMIL device made by Quadro Engineering, Inc.

EXAMPLES

The following Examples are further illustrative of the invention. All parts and percentages are by weight unless otherwise indicated.

EXAMPLE I

The combination of apparatus utilized for this Example for practicing an embodiment of the process of this invention comprises a feeding device, shaper, rotary vacuum drum, discharge knife and subdivider and size-selection device, as generally illustrated in FIG. 1. Pulverulent spray-dried coffee is the material to be agglomerated by the method and apparatus of the present invention. The average particle size of the spray-dried coffee is about 72μ, its bulk density is about 340 g/l and it has a moisture content of about 3.3% by weight.

The rotary drum has a width of about 0.3 m and a working surface area of about 0.9 $m^2$. The pores of the drum surface have openings of from about 2μ to about 5μ and a porosity of about $0.47\times10^{-3}$ $m^3$/sec. The durm is rotated at a peripheral velocity of about $50\times10^{-3}$ m/sec. A reduced pressure of about 0.983 atm is applied and maintained within the drum. Material is deposited on the drum from a hopper which has a length over the surface width of the drum of about 0.3 m. A flat surface shaper of about 0.3 m in length is utilized over the width of the drum. Flow controls are utilized for continuously feeding the material, and after being shaped by the surface shaper, a 25 mm layer of material is positioned on the drum after the shaper.

A nozzle for directing heated humid air to the material on the drum is a rectangular air duct having a cross-section of about 0.1 m in length over the width of the drum by about 0.25 m. The temperature of the heated humid air directed by the nozzle towards the shaped layer of material on the drum is about 88° C. and humidity of the air is about 0.32 kg water/kg air. The velocity of the heated humid air directed through the nozzle at the layer of material is about $90\times10^{-3}$ m/sec which corresponds to a Reynolds number of about 620. By reason of the rate of rotation of the drum, the residence time of the material being contacted by the heated humid air is about 2 sec.

The system is run continuously at the above conditions and, upon reaching a steady state, a fused layer about 4 mm thick is removed continuously from the drum via a discharge knife. The sheet then is discharged into a ROTEX subdivider and sized with screens having about 2.4 mm and 0.7 mm openings.

The product between 2.4 mm and 0.7 mm has a freezedried appearance, a density of 240 g/l and a moisture content of about 4.3% before drying. The oversized agglomerates are returned to the subdivider for further treatment to obtain further product between 2.4 mm and 0.7 mm, and the undersized agglomerates are recycled.

EXAMPLE II

The combination of apparatus utilized for practicing a further embodiment of the process of this invention comprises an apparatus as depicted in FIG. 3, wherein the fused material is screened and then reinforced after passing over an air film slide.

The material to be agglomerated is a spray-dried coffee powder having an average particle size of about 41μ, a bulk density of 455 g/l and a moisture content of about 3% by weight. The reduced pressure applied within the drum is the same as that in Example I. The means for depositing the material on the drum and the means for directing the flow of heated humid air towards the layer of material deposited and shaped on the drum are the same as in Example I.

A corrugated shaper is utilized to form a smooth corrugated surface layer of material on the drum. The shaper is set for providing a bed depth of 22 mm in the valleys and 25 mm in the ridges. The temperature of the heated humid air directed to the layer of material on the drum is maintained at about 88° C. and the humidity of the air is maintained at about 0.36 kg water/kg air. The superficial velocity of the heated humid air is about $90\times10^{-3}$ m/sec, as in Example I.

The drum is rotated at a peripheral speed of $50\times10^{-3}$ m/sec and upon reaching steady state, a fused layer, which experiences a residence time of about 2 sec in the heated humid air, is peeled off in the form of a sheet, which varies from about 2 mm thick in the valleys to about 5 mm thick in the ridges, via a discharge doctor blade knife and is moved over an inclined vibrating screen for separating unfused material from fused material.

The sheet then is directed by a support slide to pass over an air film slide to be vertically disposed. The air film slide has pores having a size of about 10μ. An air pressure of 2 kPa is supplied to the porous surface of the slide. After traversing the air film slide and being vertically disposed, the sheet is passed between means for supplying an air curtain and means for providing diffusive steam for supplying heated humid air for reinforcing the underside of the sheet, in accordance with the foregoing disclosure of FIG. 3. The steam is supplied to the diffusive steam enclosure under a pressure of 4 kPa. An absolute humidity of about 0.1 kg water/kg air is obtained and the heated humid air effectively contacts the bottom side of the sheet for about 3 sec. The air from the air curtain has a velocity of about 9 m/sec.

The reinforced sheet has good mechanical strength.

After being subdivided manually and sized between screens having about 2.4 mm and 0.8 mm openings, the reinforced sheet provides a product in that size range which yielded about 31.5%, had a density of about 320 g/l and had a moisture content of about 5.7%.

EXAMPLE III

The feed powder is the same as utilized in Example I. A corrugated shaper is utilized as in Example II.

A nozzle which is of the same length over the surface width of the drum but which is wider by about 0.1 m than the nozzle utilized in the prior Examples directs the heated humid air towards the layer of material. The rate of rotation of the drum is the same as in the prior Examples. This provides a residence time for the material in contact with the heated humid air of about 4 sec. The temperature of the heated humid air is about 86° C. and the humidity is about 0.4 kg water/kg air. The reduced pressure applied within the drum is about 0.95 atm, as compared with about 0.98 atm of the prior Examples. The layer of material on the drum at steady state is about 22 mm to about 25 mm thick in the valleys and the ridges, respectively.

A layer of fused material of about 2 mm in the valleys to about 5 mm thick in the ridges is peeled off the unfused layer on the drum and passed over a vibrating screen as in Example II. After the vibrating screen and support slide, the underside of the sheet of fused material is contacted in an enclosure with heated humid air having an absolute humidity of about 1.1 kg water/kg air via the guided crocodile nozzle embodiments of FIGS. 5 and 6. The velocity of the low velocity crocodile nozzle steam is 1 m/sec and the velocity of the high velocity steam is 60 m/sec. The contacting of the sheet with the humid air is performed in an enclosure wherein hot air having a temprature of 80° C. is introduced at the bottom of the enclosure, and air and steam are evacuated from the top of the enclosure for maintaining a negative pressure of about 0.9994 atm.

In this embodiment, pieces of the sheet are partially fractured by a wall of the enclosure and are collected from the bottom of the enclosure and then subdivided manually to a desired particle size determined by sizing on screens having about 2.4 mm and 0.8 mm openings.

The process yields 37% of the product having the desired size. The density of the product is 228 g/l, and it has a moisture content of about 6.1%.

From the foregoing, it will be clear to one of ordinary skill that various embodiments can be utilized to effect the objects of the present invention as described and illustrated without departing from the spirit and scope of the invention defined by the following claims.

I claim:

1. A process for agglomerating particles of water-soluble particulate materials comprising conveying a layer of particles of water-soluble particulate material on a porous surface, directing a laminar flow of heated humid air towards the layer of particles being conveyed and applying a reduced pressure from beneath the porous surface for drawing the heated humid air to the layer of the material for contacting the heated humid air with particles of the conveyed particulate material layer for a time sufficient for fusing particles of the layer at points of contact between the surfaces of the particles while substantially avoiding condensation of moisture in voids between the surfaces of the particles.

2. A process according to claim 1 for agglomerating the materials and for then obtaining agglomerates further comprising removing the fused layer from the porous surface and subdividing the fused layer.

3. A process according to claim 1 wherein the porous surface is a surface of a rotary drum and the reduced pressure is applied from within the drum in an amount which is at least sufficient for maintaining the layer of the material on the porous surface of the drum throughout complete rotation of the drum.

4. A process according to claim 1 or 2 or 3 wherein the fused layer is in the form of a sheet further comprising directing heated humid air at the sheet to a side of the sheet which was closest to the porous surface for fusing particles of the sheet at points of contact between the surfaces of the particles while substantially avoiding condensation of moisture in voids between the surfaces of the particles for reinforcing the sheet.

5. A process according to claim 1 or 2 or 3 wherein the particles to be agglomerated have an average particle size of from about $40\mu$ to about $150\mu$ and the laminar flow of heated humid air has a temperature of from about 40° C. to about 100° C., an absolute humidity of from about 0.1 kg water/kg air to about 0.8 kg water/kg air and is directed at the layer at a superficial velocity of below about $340 \times 10^{-3}$ m/sec, wherein the reduced pressure is from about 0.829 atm to about 0.996 atm and wherein the heated humid air contacts the layer of conveyed particles for from about 1 sec to 6 sec.

6. A process according to claim 1 or 2 or 3 wherein the particulate material is soluble coffee.

7. A process according to claim 5 wherein the laminar flow of heated humid air is directed at the layer at a superficial velocity of from about $22 \times 10^{-3}$ m/sec to $200 \times 100^{-3}$ m/sec.

8. A process according to claim 5 wherein the fused layer is in the form of a sheet and further comprising directing heateed humid air at the sheet to a side of the sheet which was closest to the porous surface for fusing particles of the sheet at points of contact between the surfaces of the particles while substantially avoiding condensation of moisture in voids between the surfaces of the particles for reinforcing the sheet.

9. A process according to claim 4 wherein the heated humid air for reinforcing the sheet is supplied in a form of diffusive steam having an average absolute humidity of from about 0.05 kg water/kg air to about 0.02 kg water/kg air for contacting the sheet.

10. A process according to claim 9 wherein the particles to be agglomerted have an average particle size of less than about $80\mu$ and wherein the sheet to be reinforced is in a vertical orientation.

11. A process according to claim 4 wherein the heated humid air for reinforcing the sheet is directed at the sheet in a form of a first stream of steam having a velocity of from about 0.5 m/sec to about 2 m/sec and a second stream of steam having a velocity of from about 40 m/sec to about 80 m/sec, wherein the second stream of steam guides the first stream of steam towards the sheet for contacting the sheet with heated humid air.

12. A process according to claim 1 wherein the heated humid air contacting the sheet has an absolute humidity of from about 0.5 kg water/kg air to about 1.5 kg water/kg air.

* * * * *